(12) United States Patent
Lim et al.

(10) Patent No.: US 11,750,941 B1
(45) Date of Patent: Sep. 5, 2023

(54) IMAGING CIRCUIT CAPABLE OF SENSING FLICKERING LIGHT

(71) Applicant: PixArt Imaging Incorporation, HsinChu (TW)

(72) Inventors: Wooi-Kip Lim, Penang (MY); Shan-Chong Tan, Penang (MY)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 17/737,190

(22) Filed: May 5, 2022

(51) Int. Cl.
*H04N 25/53* (2023.01)
*H04N 25/76* (2023.01)

(52) U.S. Cl.
CPC ............ *H04N 25/53* (2023.01); *H04N 25/76* (2023.01)

(58) Field of Classification Search
CPC combination set(s) only.
See application file for complete search history.

(56) References Cited

U.S. PATENT DOCUMENTS

| | | | |
|---|---|---|---|
| 10,194,129 B2* | 1/2019 | Chang | H04N 13/254 |
| 2018/0205869 A1* | 7/2018 | Kim | H04N 25/531 |
| 2020/0252532 A1* | 8/2020 | Shimokawa | H04N 23/72 |
| 2021/0258561 A1* | 8/2021 | Smilansky | H04N 13/296 |

* cited by examiner

*Primary Examiner* — Mekonnen D Dagnew
(74) *Attorney, Agent, or Firm* — Tung & Associates

(57) ABSTRACT

An imaging circuit includes plural pixel circuits which are arranged in a pixel array. Each of the plural pixel circuits includes an image sensing device which is configured to sense a normal imaging light shedding on the imaging circuit with a predetermined frame rate. At least a portion of the plural pixel circuits are first type pixel circuits. Each of the first type pixel circuit further includes a flicker sensing device. Plural flicker sensing devices in the pixel array are coupled in parallel to sense a flickering light shedding on the imaging circuit to generate a flicker indicating signal.

22 Claims, 12 Drawing Sheets

IMAGING CIRCUIT CAPABLE OF SENSING
FLICKERING LIGHT

BACKGROUND OF THE INVENTION

Field of Invention

The present invention relates to an imaging circuit. Particularly, it relates to an imaging circuit capable of sensing flickering light for motion detection.

Description of Related Art

FIG. 1 shows a schematic diagram of a prior art pixel circuit for use in a global shutter imaging circuit. The pixel circuit 101 includes a photo diode PD configured to operably generate charge in response to incident radiation. Other circuitries of the pixel circuit 101, e.g. a reset switch MR, an amplifier transistor MA and a buffering transistor MS, incorporate the photo diode PD to generate a light sensing signal Vo.

FIG. 2 shows a layout diagram of a prior art imaging circuit for motion detection employing the pixel circuit shown in FIG. 1. The imaging circuit 102 includes for example a 6 by 6 two dimensional pixel array formed by the pixel circuit (e.g. 101). This layout diagram shows photo diode area for illustrating and layout of other circuitries in the pixel circuits are omitted. The photo diodes of the pixel circuits, illustrated in dots, located in the inner area are configured to sense a normal imaging light shedding on the imaging circuit with a predetermined frame rate to form a sequence of motion pictures, so as to determine for example whether a motion object exists. Another photo diode PD", illustrated in slashes, located in the outer ringed area is configured to sense a flickering light shedding on the imaging circuit to generate a flicker indicating signal Sf in continuous time.

FIG. 3A shows a typical flicker detection circuit 103. FIG. 3B shows a typical flicker indicating signal corresponding to FIG. 3A. The ambient light source for the imaging circuit 101 for motion detection may be a fluorescent light source which flickers with a frequency, for example 60 Hz or a multiple. The flicker detection circuit 103 is employed to sense the flickering light to prevent false motion detection due to light flickering. The flicker detection circuit 103 is configured to sense the photon current Ipf generated by the photo diode PD" to generate the flicker indicating signal Sf, in a periodic pulsed form as shown in FIG. 3B. The frequency of the flicker indicating signal Sf (i.e. 1/Tflkr) is related to (e.g. the same as) the frequency of the flickering light. Tflkr indicates the period of the flicker indicating signal Sf.

One typical scheme for preventing false motion detection is that the imaging circuit 101 reads image sensing signals (i.e. Vo) generated according to the pixel circuits when the flicker indicating signal Sf indicates intensity of the flickering light exceeds an intensity threshold Lth, and stops reading or uses a preset frequency to read image sensing signals generated according to the pixel circuits when the flicker indicating signal Sf indicates intensity of the flickering light does not exceed the intensity threshold Lth. Note that the photon current Ipf is correlated to the intensity of the flickering light.

A drawback of the prior art shown in FIG. 1 and FIG. 2 is that when the ambient flickering light is relatively weak or is shed in focus on some small area within the inner pixel array instead of the ringed area of the image circuit shown in FIG. 1B, the flicker detection circuit 103 cannot generate proper flicker indicating signal Sf and can cause false motion detection results.

Compared to the prior art shown in FIG. 1 and FIG. 2, this invention can greatly improve the capability of sensing the flickering light and thus can provide robust motion detection function.

SUMMARY OF THE INVENTION

From one perspective, the present invention provides an imaging circuit, comprising: plural pixel circuits, which are arranged in a pixel array, wherein each of the plural pixel circuits includes an image sensing device which is configured to sense a normal imaging light shedding on the imaging circuit with a predetermined frame rate, wherein at least a portion of the plural pixel circuits are first type pixel circuits, wherein each of the first type pixel circuit further includes a flicker sensing device, wherein plural flicker sensing devices in the pixel array are coupled in parallel to sense a flickering light shedding on the imaging circuit to generate a flicker indicating signal.

In one preferred embodiment, the plural pixel circuits generate corresponding image sensing signals according to the corresponding image sensing devices when the flicker indicating signal indicates that intensity of the flickering light exceeds an intensity threshold; wherein when the flicker indicating signal indicates intensity of the flickering light does not exceed the intensity threshold, the plural pixel circuits stop generating the image sensing signals, or the imaging circuit stops processing the image sensing signals or generates the image sensing signals according to a preset frequency.

In one preferred embodiment, the imaging circuit further comprises a flicker detection circuit, configured to generate the flicker indicating signal by comparing a flicker sensing signal generated by at least one of the flicker sensing device to a reference signal to determine whether the intensity of the flickering light exceeds the intensity threshold.

In one preferred embodiment, a frequency of the flicker indicating signal is related to or is equal to a frequency of the flickering light.

In one preferred embodiment, image frames formed by image sensing signals are compared for motion detection.

In one preferred embodiment, the first type pixel circuits are arranged to be evenly distributed in the pixel array.

In one preferred embodiment, each of the pixel circuits includes the flicker sensing device.

In one preferred embodiment, each of another portion of the plural pixel circuits is a second type pixel circuit, wherein in at least one dimension, at least one first type pixel circuit and at least one second type pixel circuit are arranged in a predetermined pattern which is repeated in the at least one dimension; wherein the second type pixel circuit is irresponsive to the flickering light in continuous time.

In one preferred embodiment, the predetermined pattern is repeated in a first dimension, and is duplicated along a second dimension.

In one preferred embodiment, the predetermined pattern is duplicated along the other dimension with a linearly changing shift in position or with an oscillating shift in position.

In one preferred embodiment, in the at least one dimension, each pair of the first type pixel circuits which are located in neighbor with each other are separated by at least one second type pixel circuit.

In one preferred embodiment, in the at least one dimension, each pair of the second type pixel circuits which are located in neighbor with each other are separated by at least one first type pixel circuit.

In one preferred embodiment, the first type pixel circuits are arranged in plural ringed areas in the pixel array, wherein the first type pixel circuits located in neighboring ringed areas are separated by a ringed area which is formed by second type pixel circuits, wherein the second type pixel circuit is irresponsive to the flickering light.

In one preferred embodiment, a first portion of the plural flicker sensing devices in the pixel array are coupled in parallel to form a first flicker sensing unit to operably sense the flickering light shedding on the first portion of the plural flicker sensing devices, and a second portion of the plural flicker sensing devices in the pixel array are coupled in parallel to form a second flicker sensing unit to operably sense the flickering light shedding on the second portion of the plural flicker sensing devices, wherein the first flicker sensing unit and the second flicker sensing unit are coupled, other than being electrically coupled directly in parallel, to generate the flicker indicating signal.

In one preferred embodiment, the first flicker sensing unit is electrically coupled to a first resistor as a first branch and the second flicker sensing unit is electrically coupled to a second resistor as a second branch, wherein the first branch and the second branch are coupled to sense the flickering light shedding on the imaging circuit to generate the flicker indicating signal.

In one preferred embodiment, a first portion of the plural flicker sensing devices in the pixel array are coupled in parallel to forma first flicker sensing unit to operably sense the flickering light shedding on the first portion of the plural flicker sensing devices to generate a first flicker sensing signal, and a second portion of the plural flicker sensing devices in the pixel array are coupled in parallel to form a second flicker sensing unit to operably sense the flickering light shedding on the second portion of the plural flicker sensing devices to generate a second flicker sensing signal; wherein the imaging circuit further comprising a first flicker detection circuit and a second flicker detection circuit, wherein the first flicker detection circuit is configured to generate a first flicker indicating signal according to the first flicker sensing signal to determine whether the intensity of the flickering light shedding on the first portion of the plural flicker sensing devices exceeds an intensity threshold, and the second flicker detection circuit is configured to generate a second flicker indicating signal according to the second flicker sensing signal to determine whether the intensity of the flickering light shedding on the second portion of the plural flicker sensing devices exceeds an intensity threshold.

In one preferred embodiment, the flicker sensing device and the image sensing device are arranged as one of the following: at least a portion of periphery of the flicker sensing device is adjacent to a portion of periphery of the image sensing device; or the flicker sensing device is enclosed by the image sensing device.

In one preferred embodiment, the image sensing device and the flicker sensing device have the same light to electrical characteristic, or have different light to electrical characteristics.

In one preferred embodiment, the image sensing device includes a silicon P-N junction, and/or the flicker sensing device includes another silicon P-N junction.

In one preferred embodiment, the flicker sensing device is configured to sense the flickering light in continuous time.

In one preferred embodiment, the area of the image sensing device is larger than the area of the flicker sensing device.

In one preferred embodiment, each of another portion of the plural pixel circuits is a second type pixel circuit, wherein the first type pixel circuits and the second type pixel circuits are arranged in a random sequence in the at least one dimension, wherein the second type pixel circuit is irresponsive to the flickering light in continuous time.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
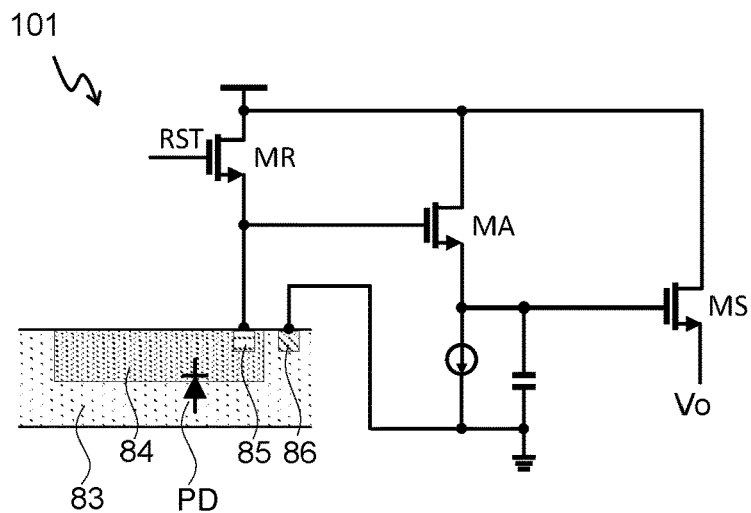
FIG. 1 shows a schematic diagram of a prior art pixel circuit.
Figure 2:
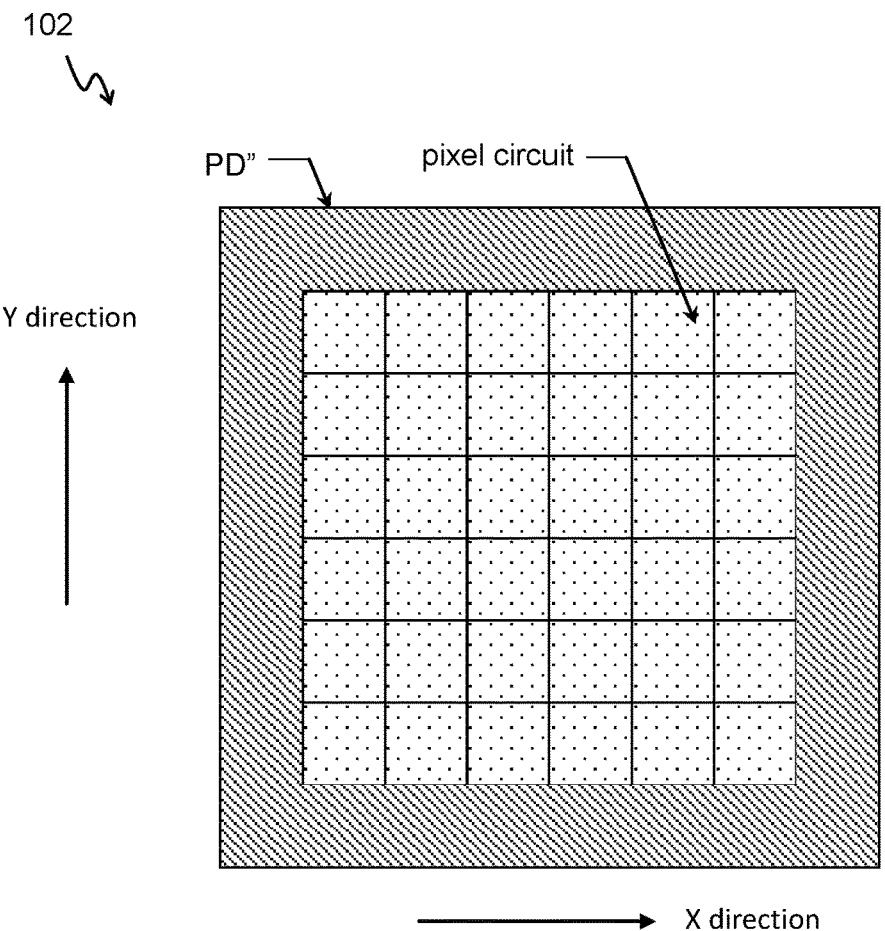
FIG. 2 shows a prior art imaging circuit for motion detection.
Figure 3A:
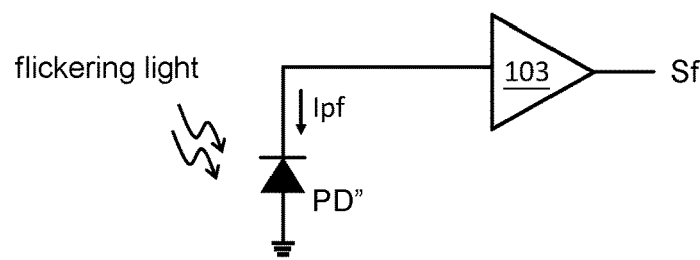
FIG. 3A shows a typical flicker detection circuit.
Figure 3B:
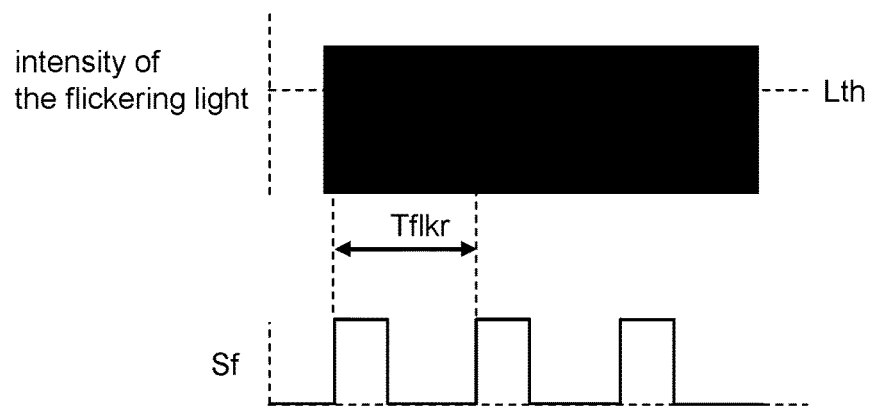
FIG. 3B shows a typical flicker indicating signal.
Figure 4:
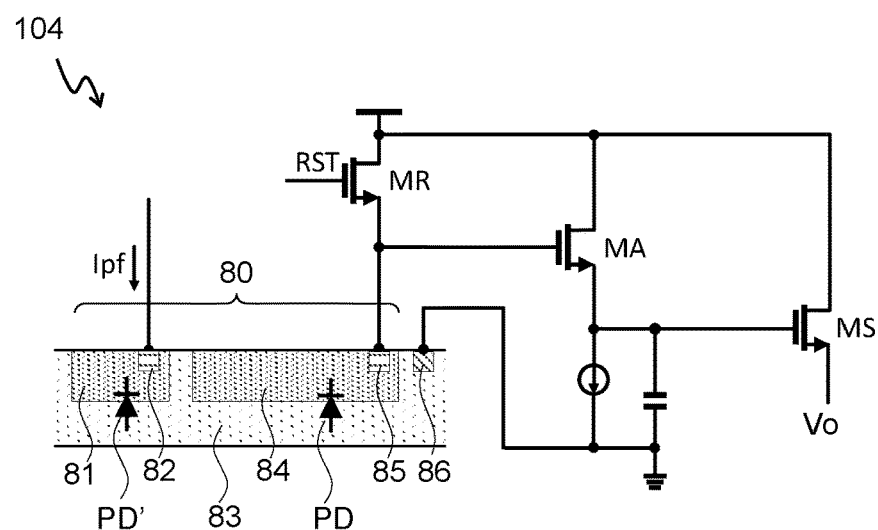
FIG. 4 shows a schematic diagram of one embodiment of the pixel circuit for use in the global shutter imaging circuit according to the present invention.

FIG. 4 shows a schematic diagram of one embodiment of the pixel circuit for use in the global shutter imaging circuit according to the present invention. The pixel circuit 104 includes image sensing device (e.g. photo diode PD) and a flicker sensing device (e.g. photo diode PD'). More specifically, a cross section view 80 including the photo diode PD and the photo diode PD' is shown in FIG. 4. The P-N junction between the P-type silicon substrate 83 and the N-type well region 84 form the photo diode PD. The photo diode PD is electrically coupled through a P-type contact 86 and an N-type contact 85. The P-N junction between the P-type silicon substrate 83 and the N-type well region 81 form the photo diode PD'. The photo diode PD' is electrically coupled through the P-type contact 86 and an N-type contact 82. The photo diode PD and PD' is not limited to the aforementioned embodiment and can alternatively be other types of photo sensitive devices.

The photo diode PD and other circuitries are configured to sense a normal imaging light shedding on the imaging circuit with a predetermined frame rate to form a sequence of motion pictures, so as to determine for example whether a motion object exists. In one embodiment, a reset transistor MR is configured to reset the charges on the cathode of the photo diode PD, controlled by the control signal RST. A transistor MA incorporating a current source is configured to amplify the signal on the cathode of the photo diode PD to store an amplified signal to a storage capacitor. A transistor buffers the amplified signal on the storage capacitor to generate an image sensing signal Vo.

One typical scheme for motion detection is to compare consecutive frames and check if differences between frames are different. From a perspective, image frames formed by image sensing signals (i.e. Vo) are compared, maybe in digital form, for motion detection.

The photo diode PD' is employed to sense the flickering light. In one particular embodiment, the photo diode PD' senses the flickering light to generate a flicker sensing signal (i.e. photon current Ipf) in continuous time.

In one embodiment, the image sensing device PD and the flicker sensing device PD' have the same light to electrical characteristic. Alternatively in an embodiment, the image sensing device PD and the flicker sensing device PD' can have different light to electrical characteristics. For example the flicker sensing device PD' can be configured to be more sensitive to for example the wavelength or other characteristics of the flickering light.

Figure 5:
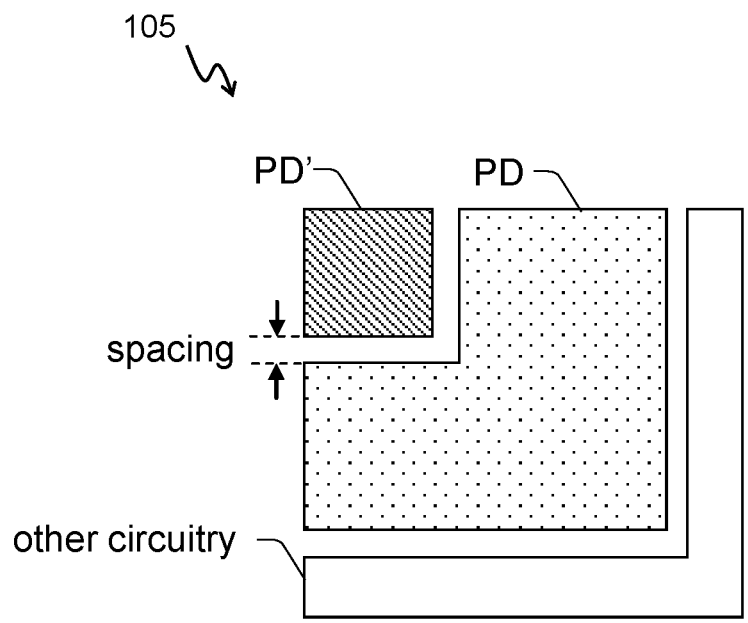
FIG. 5 shows a layout diagram of one embodiment of the pixel circuit of the imaging circuit according to the present invention.
Figure 6:
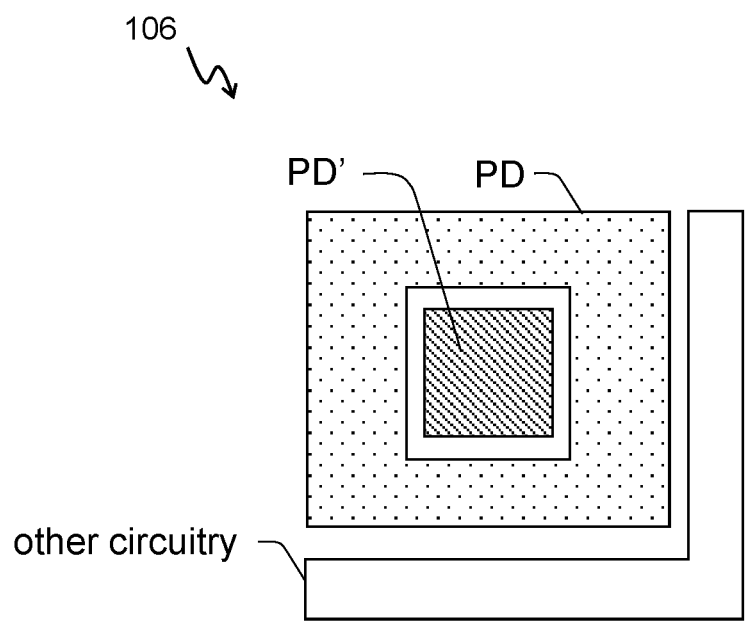
FIG. 6 shows a layout diagram of one embodiment the pixel circuit of the imaging circuit according to the present invention.

Refer to FIG. 5 and FIG. 6 which show layout diagrams (i.e. top view) of two embodiments of the pixel circuit (pixel circuit 105 and 106) according to the present invention. In one embodiment, the photon sensing area of the pixel circuit is split into two areas which form an image sensing device PD and a flicker sensing device PD' as shown in FIG. 5. The In one embodiment, the area of the photo diode PD for normal image sensing is larger than the area of the photo diode PD' for flickering light sensing. In one preferred embodiment, the ratio of the area of the photo diode PD to the area of the photo diode PD' is 4:1.

In one embodiment, the photo diode PD' can be arranged to be adjacent to the photo diode PD, as shown in FIG. 5 for example. Note that though it is described as "adjacent", proper spacing for meeting layout rules in a specific technology for isolating these two diodes is certainly allowed. In one embodiment, the photo diode PD' can be enclosed within the photo diode PD, as shown in FIG. 6. Note that the pixel circuit which includes both the image sensing device (e.g. photo diode PD) and the flicker sensing device (e.g. photo diode PD') is referred to as a first type pixel circuit hereinafter.

Figure 7:
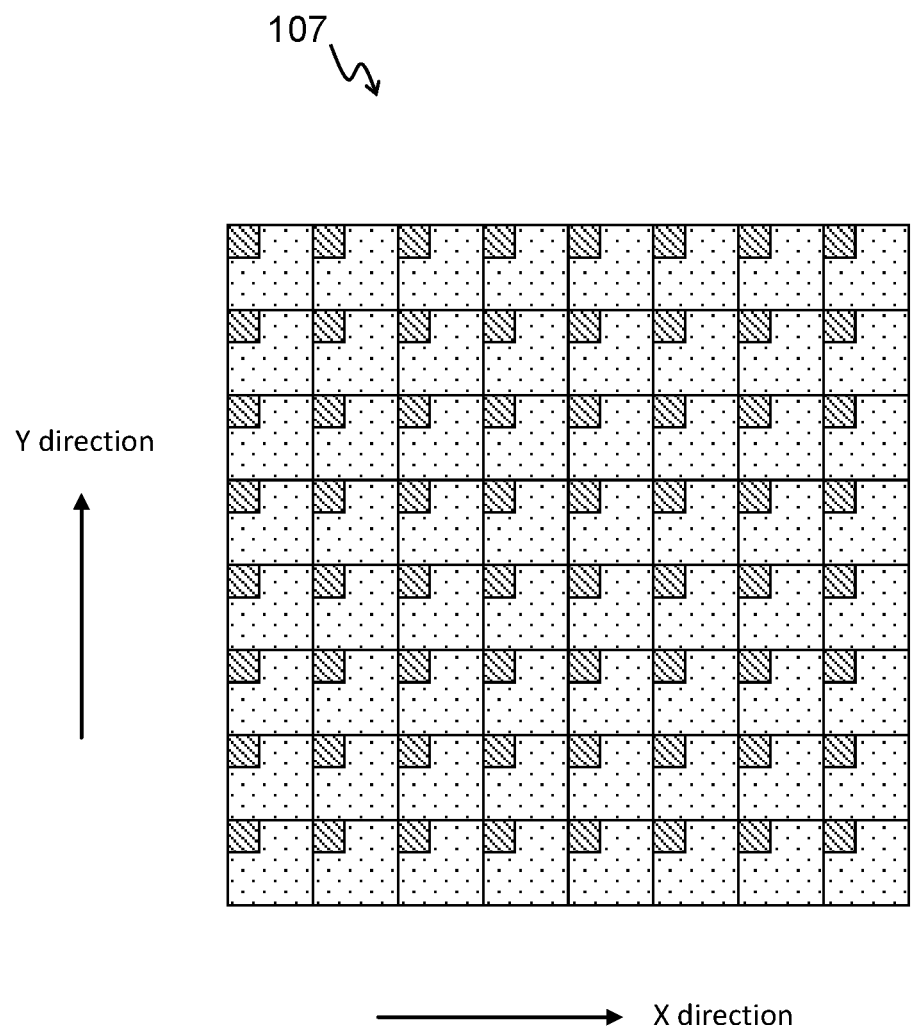
FIG. 7 shows a layout diagram of one embodiment of the imaging circuit according to the present invention.
Figure 7:
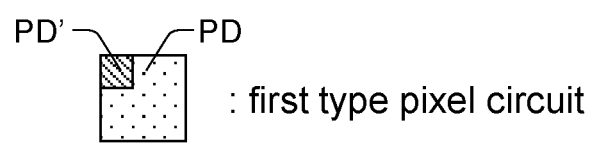

FIG. 7 shows a layout diagram of one embodiment of the imaging circuit according to the present invention. In one embodiment, the first type pixel circuits are arranged to be evenly distributed in the pixel array of the imaging circuit 107, such that the when the flickering light can be collected in a wider area range, compared to the prior art described earlier. In one particular embodiment, as shown in FIG. 7, each of the pixel circuits in the pixel array of imaging circuit includes both the image sensing device PD and the flicker sensing device PD'. In other words, all the pixel circuits in the pixel array of imaging circuit in FIG. 7 are the first type pixel circuit. Note that since the layout area of the pixel circuit is mainly dominated by the photo diodes PD and PD', layout of other circuitries are omitted herein for clarity.

Figure 8:
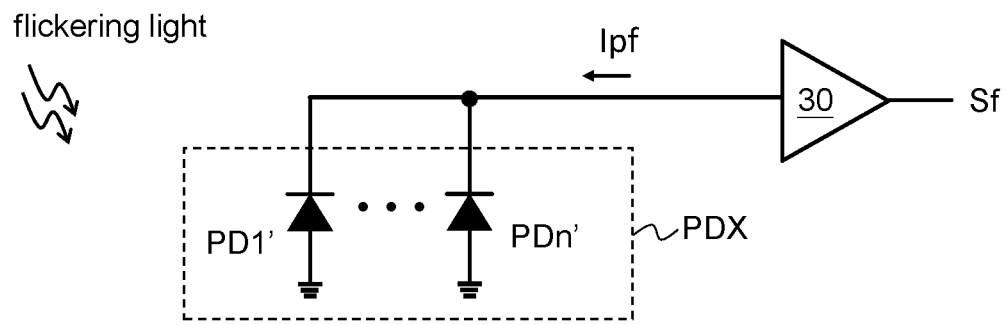
FIG. 8 shows a schematic diagram of one embodiment of the flicker detection circuit of the imaging circuit according to the present invention.

FIG. 8 shows a schematic diagram of one embodiment of the flicker detection circuit of the imaging circuit according to the present invention. In one embodiment, the imaging circuit further comprises a the flicker detection circuit 30 which is configured to generate the flicker indicating signal Sf according to a flicker sensing signal (for example corresponding to the photon current Ipf) generated by at least one of the flicker sensing device (e.g. PD1'-PDn'). In one embodiment, the flicker detection circuit 30 is configured to compare the flicker sensing signal Ipf to a reference signal to determine whether the intensity of the flickering light exceeds the intensity threshold Lth. The reference signal is related to the intensity threshold Lth.

Referring to FIG. 7 and FIG. 8, in one embodiment, all the flicker sensing devices of all the pixel circuits in the pixel array as shown in FIG. 7 can be electrically coupled in parallel to form a flicker sensing unit PDX as shown in FIG. 8 to generate the flicker sensing signal Ipf. The flicker sensing devices PD1'-PDn' correspond to the flicker sensing devices (PD') of the pixel circuits in the pixel array, wherein n is a positive integer. In one embodiment, at least a portion of the flicker sensing devices of the pixel circuits in the pixel array as shown in FIG. 7 are electrically coupled in parallel to form the flicker sensing unit PDX.

Figure 9:
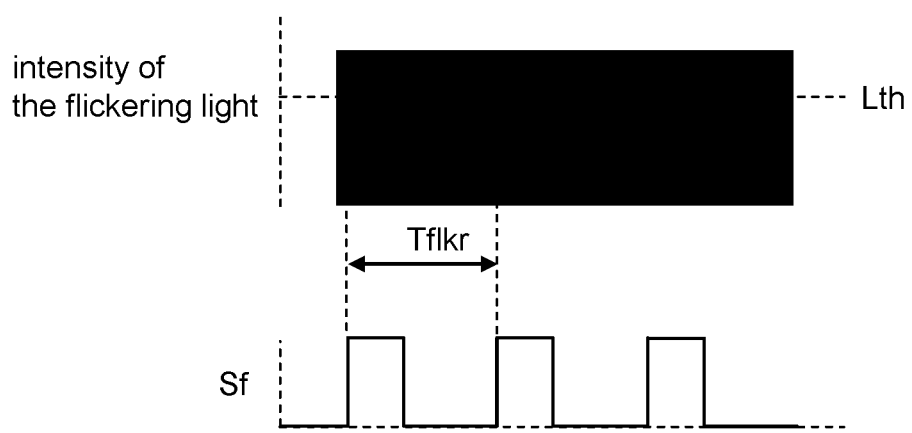
FIG. 9 shows operating waveforms corresponding to FIG. 8.

FIG. 9 shows a flicker indicating signal corresponding to FIG. 8. In one embodiment, the flicker detection circuit 30 is configured to sense the photon current Ipf to generate the flicker indicating signal Sf, in a periodic pulsed form as shown in FIG. 9. The frequency of the flicker indicating signal Sf (i.e. 1/Tflkr) is related to (e.g. the same as) the frequency of the flickering light. Tflkr indicates the period of the flicker indicating signal Sf.

In one embodiment, the pixel circuits of the imaging circuit of the present invention generate the image sensing signals (i.e. Vo) according to the image sensing devices (i.e. PD) when the flicker indicating signal Sf indicates that intensity of the flickering light exceeds an intensity threshold Lth. In one embodiment, the imaging circuit stops generating the image sensing signals when the flicker indicating signal Sf indicates that intensity of the flickering light does not exceed the intensity threshold Lth. More specifically, in one embodiment, to stop generating the image sensing signals can be achieved by for example stopping reading the image sensing signals, or by resetting the reset switch MR in FIG. 4, or simply by stopping processing the image information which is obtained from the image sensing signals in a post image processing circuit for motion detection. In one embodiment, the imaging circuit can alternatively generate the image sensing signals according to a preset frequency if intensity of the flickering light does not exceed the intensity threshold Lth.

Figure 10A:
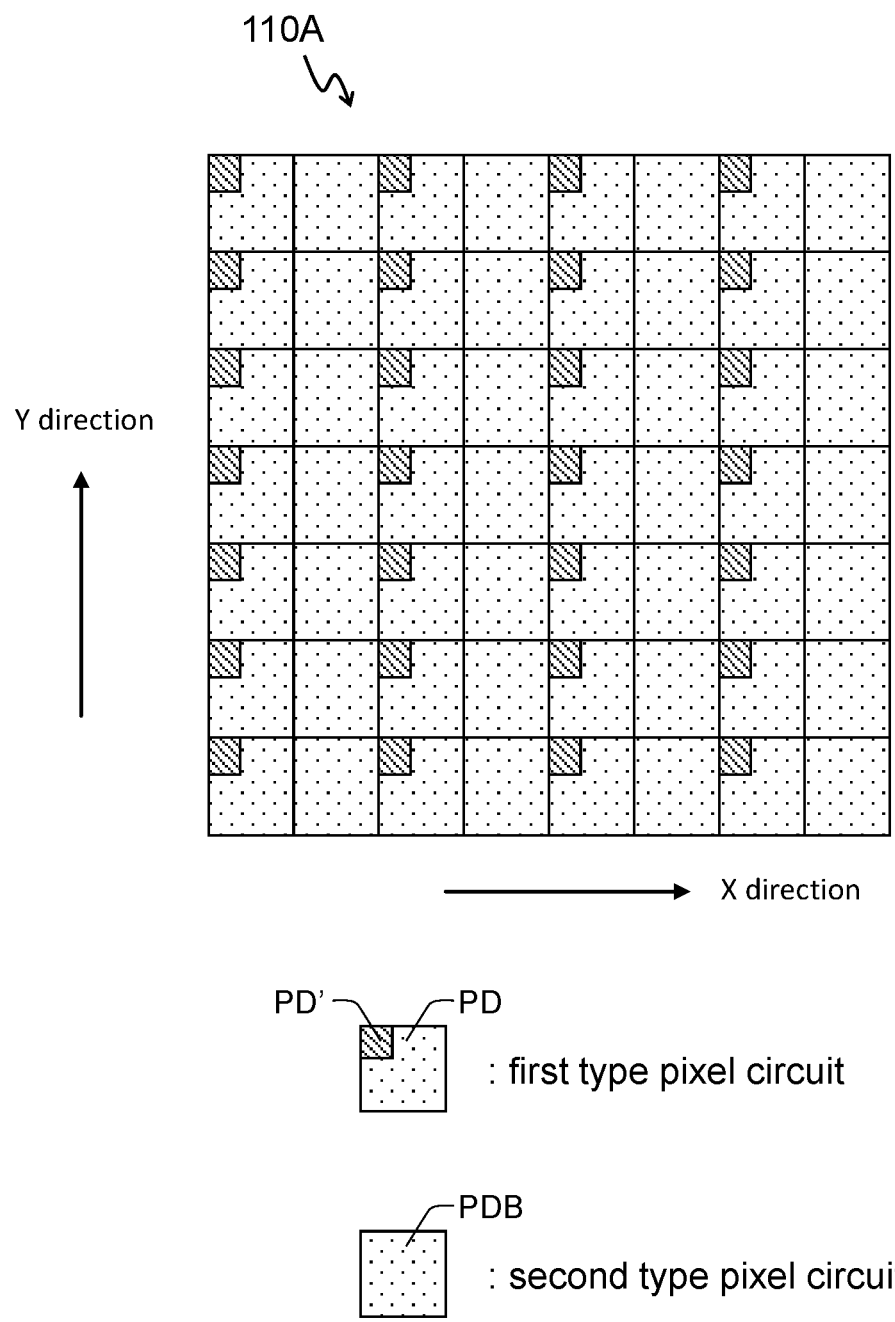
FIG. 10A and FIG. 10B show layout diagrams of other embodiments of the imaging circuit according to the present invention.
Figure 10B:
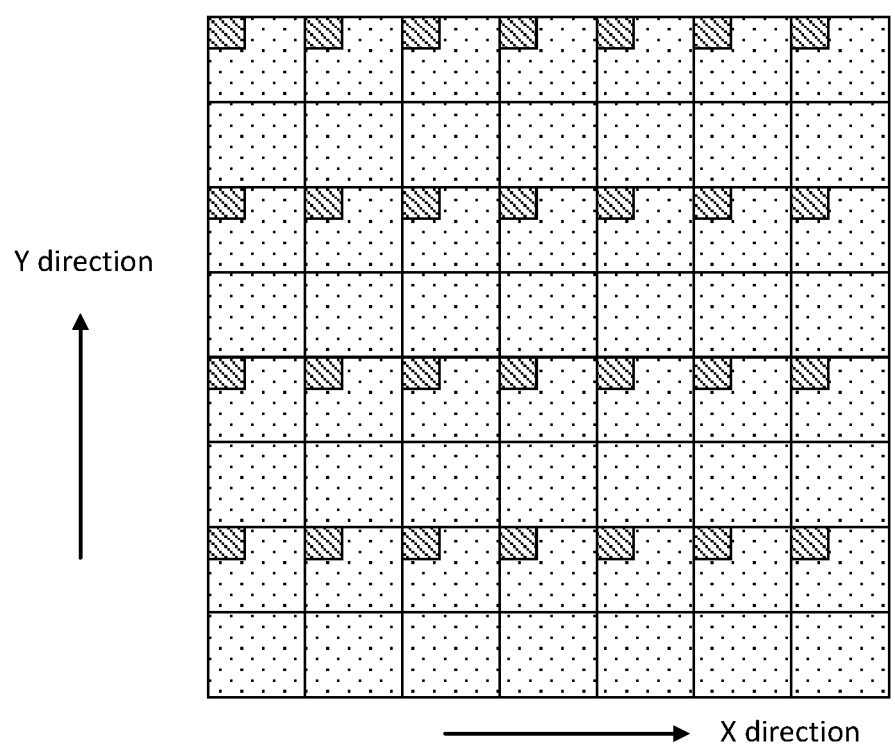

FIG. 10A and FIG. 10B show layout diagrams of other embodiments of the imaging circuit according to the present invention. The pixel array of the imaging circuit according to the present invention can comprise a second type pixel circuit which includes an image sensing device (e.g. photo diode PDB) but does not include a flicker sensing device. In other words, the image sensing devices (PDB) of the second type pixel circuits are configured, incorporating the image sensing devices (PD) of the first type pixel circuits, to sense the normal imaging light shedding on the imaging circuit (e.g. 110A) with the predetermined frame rate. However, in this embodiment, the second type pixel circuit is not configured to sense the flickering light in continuous time. From one perspective, the second type pixel circuit is irresponsive to the flickering light in continuous time. In other embodiments, the second type pixel circuit can also include a dummy flicker sensing device which will not be configured to sense the flickering light.

Still referring to FIG. 10A and FIG. 10B, in one particular embodiment, the first type pixel circuits and the second type pixel circuits are arranged in columns respectively, and the columns having the first type pixel circuits and the second type pixel circuits are arranged with an interleaving pattern (FIG. 10). The pixel array shown in FIG. 10B is similar to FIG. 10A, but different in that the first type pixel circuits and the second type pixel circuits are arranged in rows respectively with an interleaving pattern among rows.

From one perspective, taking FIG. 10A as an example, in the X direction, one first type pixel circuit and one second type pixel circuit are arranged in a predetermined pattern (e.g. the adjacent pixels are different in FIG. 10A), and the predetermined pattern is repeated in the X direction. Still referring to FIG. 10A, in this embodiment, the predetermined pattern is duplicated along Y direction.

Figure 11:
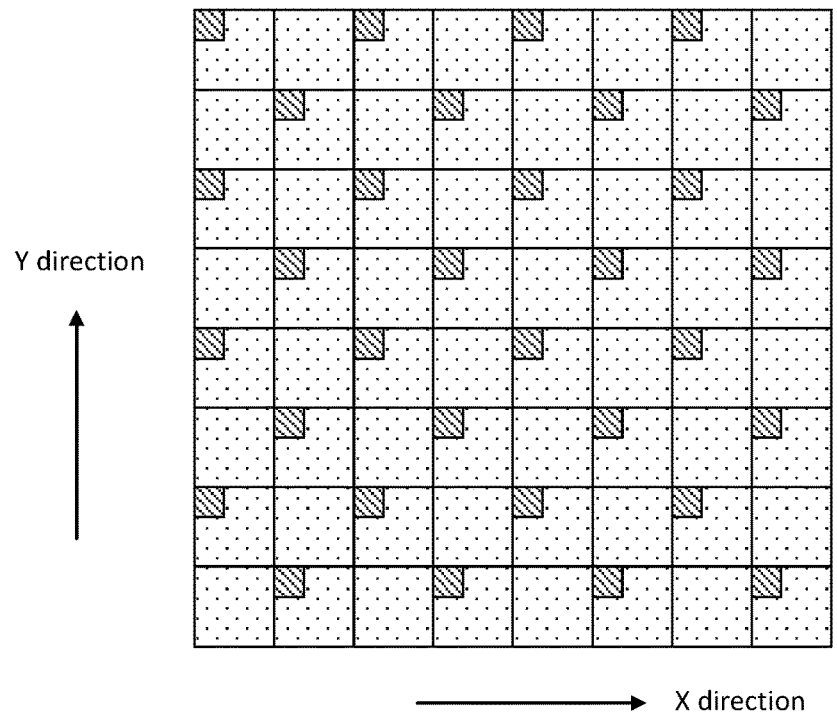
FIG. 11 shows a layout diagram of one embodiment of the imaging circuit according to the present invention.

FIG. 11 shows a layout diagram of one embodiment of the imaging circuit according to the present invention. The pixel array shown in FIG. 11 is similar to FIG. 10A, but different in that the first type pixel circuits and the second type pixel circuits are arranged in diagonal rows respectively with an interleaving pattern among the diagonal rows. From one perspective, in FIG. 11, the predetermined pattern formed by the first type pixel circuits and the second type pixel circuits are repeated along the X direction and is duplicated along the Y direction with a linearly changing shift in position (e.g. 1 multiple of the width of the pixel circuit) or with an oscillating shift in position (e.g. shifting with repeated 1 multiple and −1 multiple of the width of the pixel circuit).

Figure 12:
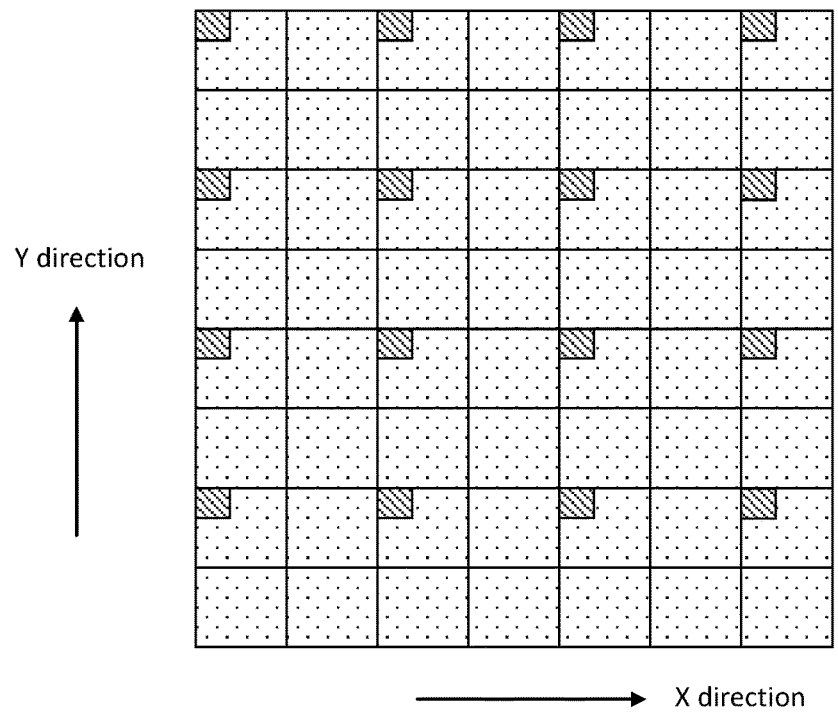
FIG. 12 shows a layout diagram of one embodiment of the imaging circuit according to the present invention.

FIG. 12 shows a layout diagram of one embodiment of the imaging circuit according to the present invention. The pixel array shown in FIG. 12 is similar to FIG. 10A, but different in that the interleaving occurs along both directions X and Y.

Figure 13:
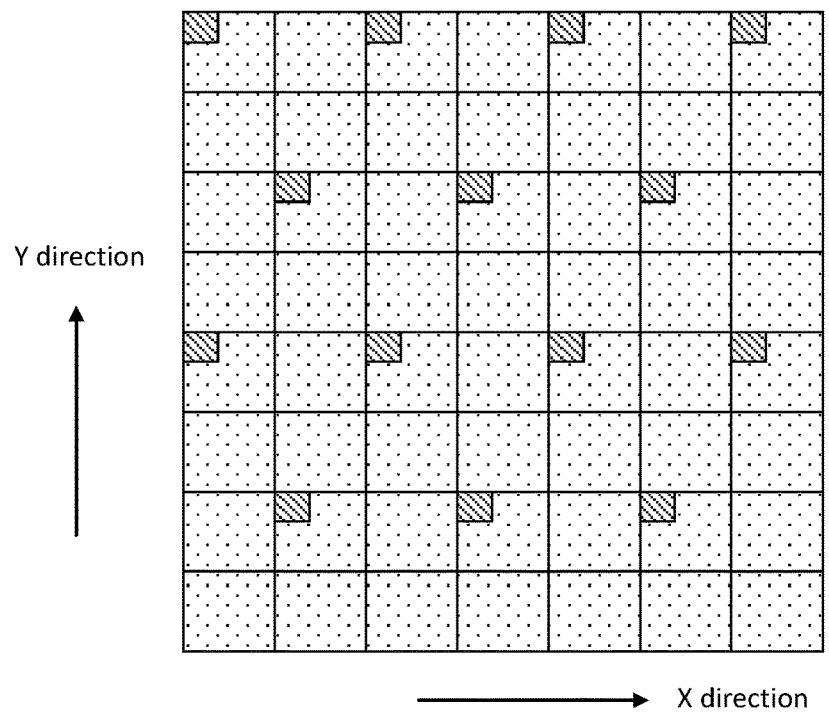
FIG. 13 shows a layout diagram of one embodiment of the imaging circuit according to the present invention.

FIG. 13 shows a layout diagram of one embodiment of the imaging circuit according to the present invention. The pixel array shown in FIG. 13 is similar to FIG. 12, but different in that the interleaving and shift in position occur at the same time.

The aforementioned repeated pattern formed the first type pixel circuit and the second type pixel circuit is not limited to the repeating of every two pixel circuits. In other embodiments, the repeated pattern can be other combinations of any number of the first type pixel circuits and any number of the second type pixel circuits.

From one perspective, the embodiments having the aforementioned repeated patterns, can be characterized in that: in the at least one dimension, each pair of the first type pixel circuits which are located in neighbor with each other are separated by at least one second type pixel circuit. In one embodiment, in the at least one dimension, each pair of the second type pixel circuits which are located in neighbor with each other are separated by at least one first type pixel circuit.

Figure 14:
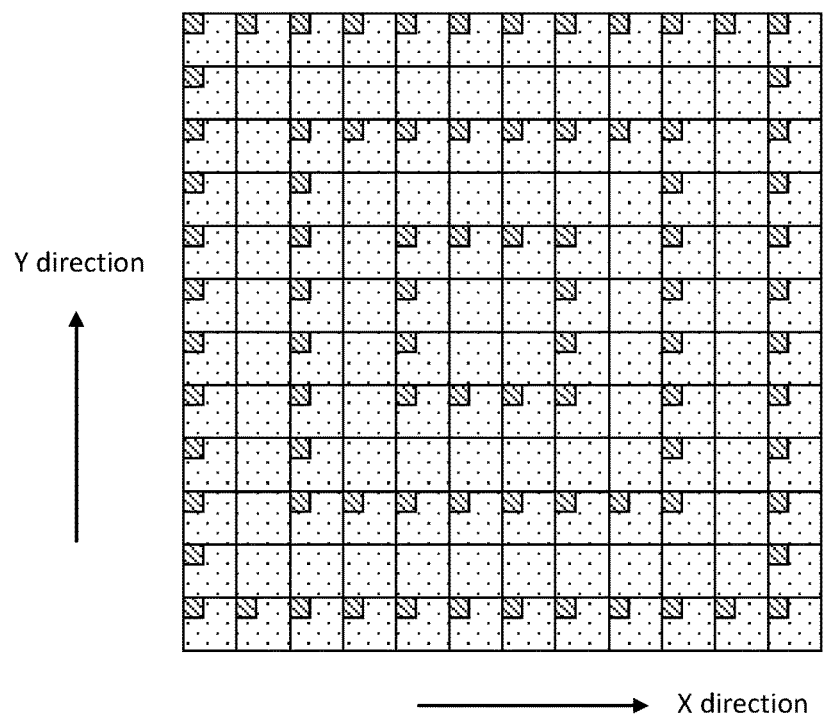
FIG. 14 shows a layout diagram of one embodiment of the imaging circuit according to the present invention.

FIG. 14 shows a layout diagram of one embodiment of the imaging circuit according to the present invention. In this embodiment, the first type pixel circuits are arranged in plural ringed areas in the pixel array. More specifically, the first type pixel circuits located in neighboring ringed areas are separated by a ringed area which is formed by the second type pixel circuits.

Figure 15:
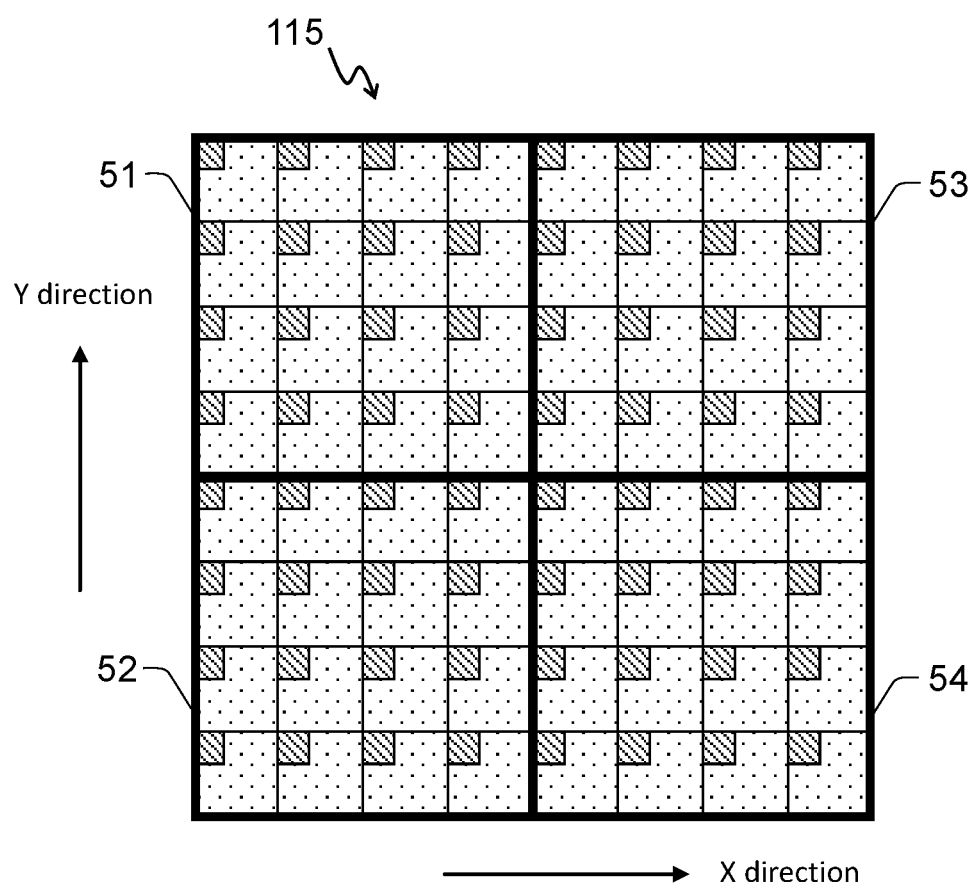
FIG. 15 shows a layout diagram of one embodiment of the imaging circuit according to the present invention.
Figure 16A:
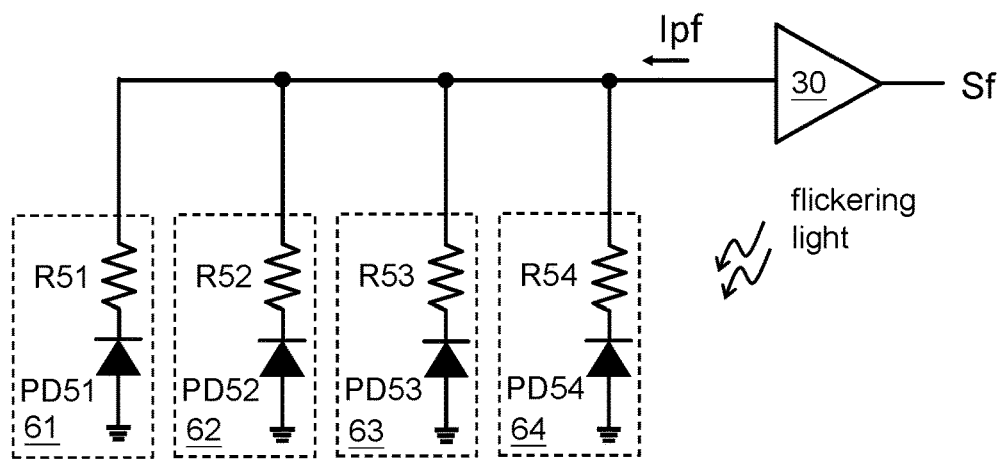
FIG. 16A shows a schematic diagram of one embodiment of the flicker detection circuit of the imaging circuit according to the present invention.
Figure 16B:
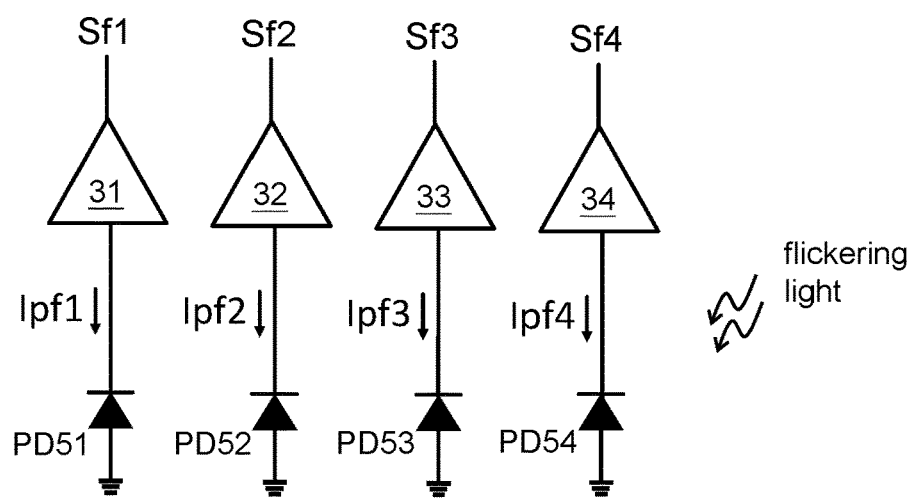
FIG. 16B shows a schematic diagram of one embodiment of the flicker detection circuits of the imaging circuit according to the present invention.

FIG. 15 shows a layout diagram of one embodiment of the imaging circuit according to the present invention. FIG. 16A and FIG. 16B show schematic diagrams of embodiments of the flicker detection circuits of the imaging circuit according to the present invention. In one embodiment, the plural flicker sensing devices (PD') in the pixel array 115 are separated into plural groups. For example, in FIG. 15, the pixel array 115 is partitioned into 4 sub-arrays R51, 52, 53 and 54, defined by the thick squared lines. The photo diodes PD' of the first type pixel circuits in the sub-array 51 are electrically coupled in parallel to forma flicker sensing unit PD51, and PD52-PD54 (FIG. 16A and FIG. 16B) are formed similarly. In one embodiment, as shown in FIG. 16A, the flicker sensing unit PD51 is electrically coupled to a resistor R51 to form a branch 61. Branches 62-64 are formed similarly with resistors R52-R54. Branches 61-64 are coupled (for example in parallel) to generate the flicker indicating signal Sf as shown in FIG. 16A. The partitioned flicker sensing units PD51-PD54 can provide higher sensitivity for detecting the flickering light shed in smaller regions of the array.

In one embodiment, as shown in FIG. 16B, flicker sensing units PD51-PD54 are coupled to the flicker detection circuits 31-34 to generate the flicker indicating signals Sf1-Sf4 respectively as shown in FIG. 16B. The partitioned flicker sensing units PD51-PD54 respectively incorporating the corresponding flicker detection circuits 31-34 not only provide higher sensitivity for detecting the flickering light shed in smaller regions of the array, but also are able to independently identify which partitioned region of the array is being shed by the flickering light.

Figure 17:
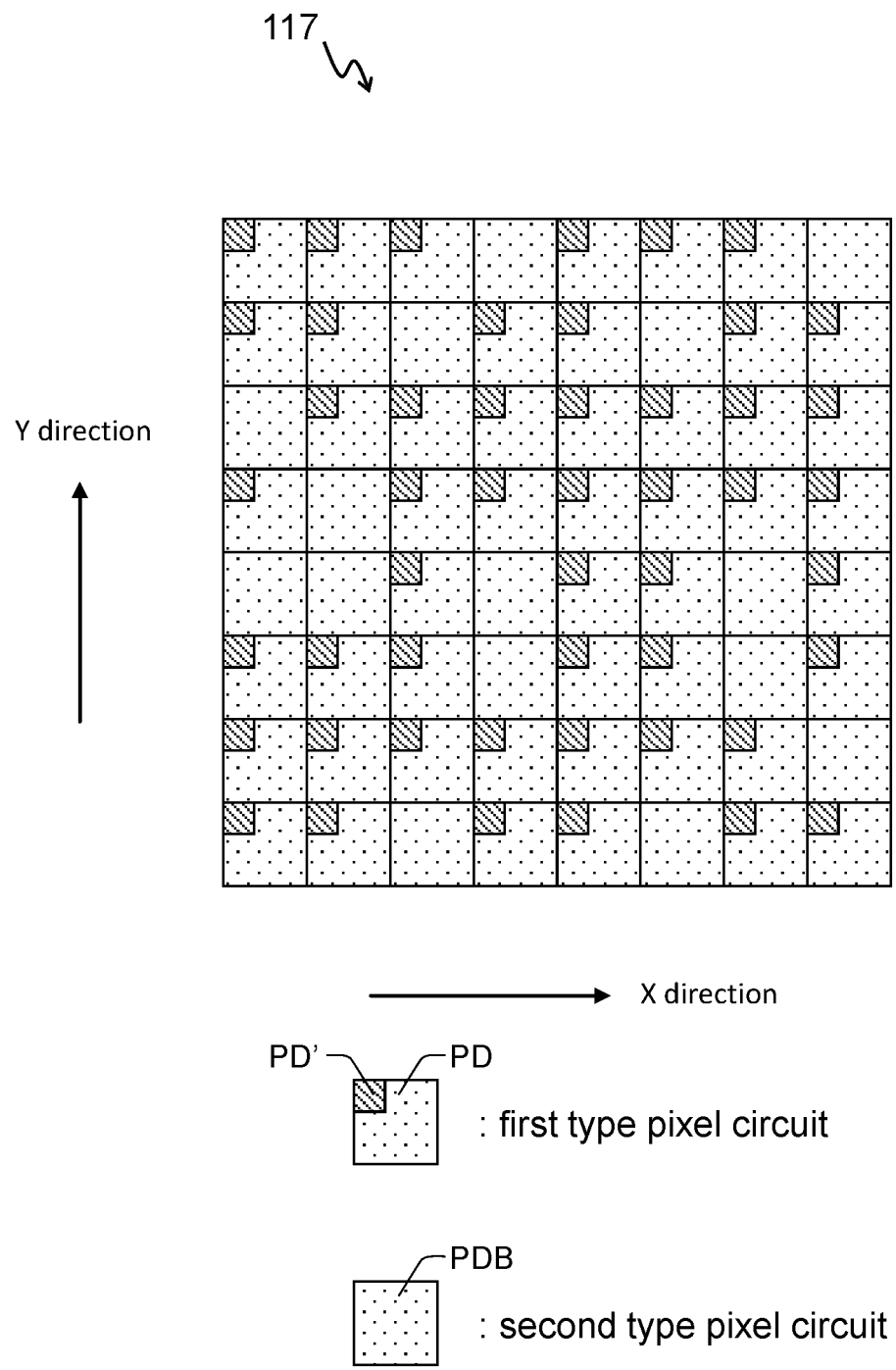
FIG. 17 shows a layout diagram of one embodiment of the imaging circuit according to the present invention.

FIG. 17 shows a layout diagram of one embodiment of the imaging circuit according to the present invention. In one embodiment, the first type pixel circuits and the second type pixel circuits are arranged in a random sequence in the at least one dimension. In this particular embodiment shown in FIG. 17, the first type pixel circuits and the second type pixel circuits are arranged randomly in both X and Y directions.

In summary, flicker sensing devices are distributed in plural much wider and/or more even arrangements than prior art to provide higher sensitivity and accuracy for sensing the flickering light in continuous time in this invention. Novel physical arrangements for a unit pixel circuit, arrays formed by the pixel circuits, and corresponding flickering detection circuits are proposed herein.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. An imaging circuit, comprising:
   plural pixel circuits, which are arranged in a pixel array, wherein each of the plural pixel circuits includes an image sensing device which is configured to sense a normal imaging light shedding on the imaging circuit with a predetermined frame rate, wherein at least a portion of the plural pixel circuits are first type pixel circuits, wherein each of the first type pixel circuit further includes a flicker sensing device, wherein plural flicker sensing devices in the pixel array are coupled in parallel to sense a flickering light shedding on the imaging circuit to generate a flicker indicating signal.

2. The imaging circuit of claim 1, wherein the plural pixel circuits generate corresponding image sensing signals according to the corresponding image sensing devices when the flicker indicating signal indicates that intensity of the flickering light exceeds an intensity threshold;
   wherein when the flicker indicating signal indicates intensity of the flickering light does not exceed the intensity threshold, the plural pixel circuits stop generating the image sensing signals, or the imaging circuit stops processing the image sensing signals or generates the image sensing signals according to a preset frequency.

3. The imaging circuit of claim 1, further comprising a flicker detection circuit, configured to generate the flicker indicating signal by comparing a flicker sensing signal generated by at least one of the flicker sensing device to a reference signal to determine whether the intensity of the flickering light exceeds the intensity threshold.

4. The imaging circuit of claim 1, wherein a frequency of the flicker indicating signal is related to or is equal to a frequency of the flickering light.

5. The imaging circuit of claim 1, wherein image frames formed by image sensing signals are compared for motion detection.

6. The imaging circuit of claim 1, wherein the first type pixel circuits are arranged to be evenly distributed in the pixel array.

7. The imaging circuit of claim 1, wherein each of the pixel circuits includes the flicker sensing device.

8. The imaging circuit of claim 6, wherein each of another portion of the plural pixel circuits is a second type pixel circuit, wherein in at least one dimension, at least one first type pixel circuit and at least one second type pixel circuit are arranged in a predetermined pattern which is repeated in the at least one dimension; wherein the second type pixel circuit is irresponsive to the flickering light in continuous time.

9. The imaging circuit of claim 8, wherein the predetermined pattern is repeated in a first dimension, and is duplicated along a second dimension.

10. The imaging circuit of claim 8, wherein the predetermined pattern is duplicated along the other dimension with a linearly changing shift in position or with an oscillating shift in position.

11. The imaging circuit of claim 8, wherein in the at least one dimension, each pair of the first type pixel circuits which are located in neighbor with each other are separated by at least one second type pixel circuit.

12. The imaging circuit of claim 8, wherein in the at least one dimension, each pair of the second type pixel circuits which are located in neighbor with each other are separated by at least one first type pixel circuit.

13. The imaging circuit of claim 1, wherein the first type pixel circuits are arranged in plural ringed areas in the pixel array, wherein the first type pixel circuits located in neighboring ringed areas are separated by a ringed area which is formed by second type pixel circuits, wherein the second type pixel circuit is irresponsive to the flickering light.

14. The imaging circuit of claim 1, wherein a first portion of the plural flicker sensing devices in the pixel array are coupled in parallel to form a first flicker sensing unit to operably sense the flickering light shedding on the first portion of the plural flicker sensing devices, and a second portion of the plural flicker sensing devices in the pixel array are coupled in parallel to form a second flicker sensing unit to operably sense the flickering light shedding on the second portion of the plural flicker sensing devices, wherein the first flicker sensing unit and the second flicker sensing unit are coupled, other than being electrically coupled directly in parallel, to generate the flicker indicating signal.

15. The imaging circuit of claim 14, wherein the first flicker sensing unit is electrically coupled to a first resistor as a first branch and the second flicker sensing unit is electrically coupled to a second resistor as a second branch, wherein the first branch and the second branch are coupled to sense the flickering light shedding on the imaging circuit to generate the flicker indicating signal.

16. The imaging circuit of claim 1, wherein a first portion of the plural flicker sensing devices in the pixel array are coupled in parallel to form a first flicker sensing unit to operably sense the flickering light shedding on the first portion of the plural flicker sensing devices to generate a first flicker sensing signal, and a second portion of the plural flicker sensing devices in the pixel array are coupled in parallel to form a second flicker sensing unit to operably sense the flickering light shedding on the second portion of the plural flicker sensing devices to generate a second flicker sensing signal;
   wherein the imaging circuit further comprising a first flicker detection circuit and a second flicker detection circuit, wherein the first flicker detection circuit is configured to generate a first flicker indicating signal according to the first flicker sensing signal to determine whether the intensity of the flickering light shedding on the first portion of the plural flicker sensing devices exceeds an intensity threshold, and the second flicker detection circuit is configured to generate a second flicker indicating signal according to the second flicker sensing signal to determine whether the intensity of the flickering light shedding on the second portion of the plural flicker sensing devices exceeds an intensity threshold.

17. The imaging circuit of claim 1, wherein the flicker sensing device and the image sensing device are arranged as one of the following:
- at least a portion of periphery of the flicker sensing device is adjacent to a portion of periphery of the image sensing device; or
- the flicker sensing device is enclosed by the image sensing device.

18. The imaging circuit of claim 1, wherein the image sensing device and the flicker sensing device have the same light to electrical characteristic, or have different light to electrical characteristics.

19. The imaging circuit of claim 1, wherein the image sensing device includes a silicon P-N junction, and/or the flicker sensing device includes another silicon P-N junction.

20. The imaging circuit of claim 1, wherein the flicker sensing device is configured to sense the flickering light in continuous time.

21. The imaging circuit of claim 1, wherein the area of the image sensing device is larger than the area of the flicker sensing device.

22. The imaging circuit of claim 1, wherein each of another portion of the plural pixel circuits is a second type pixel circuit, wherein the first type pixel circuits and the second type pixel circuits are arranged in a random sequence in the at least one dimension, wherein the second type pixel circuit is irresponsive to the flickering light in continuous time.

* * * * *